(12) United States Patent
Cairns

(10) Patent No.: US 9,715,068 B2
(45) Date of Patent: Jul. 25, 2017

(54) CABLE TERMINATION

(71) Applicant: PONTUS SUBSEA CONNECTORS LLC, Ormond Beach, FL (US)

(72) Inventor: James L. Cairns, Ormond Beach, FL (US)

(73) Assignee: PONTUS SUBSEA CONNECTORS LLC, Ormond Beach, FL (US)

( * ) Notice: Subject to any disclaimer, the term of this patent is extended or adjusted under 35 U.S.C. 154(b) by 0 days.

(21) Appl. No.: 15/094,043

(22) Filed: Apr. 8, 2016

(65) Prior Publication Data

US 2017/0003455 A1    Jan. 5, 2017

Related U.S. Application Data

(60) Provisional application No. 62/186,605, filed on Jun. 30, 2015.

(51) Int. Cl.
| | | |
|---|---|---|
| G02B 6/38 | (2006.01) | |
| G02B 6/44 | (2006.01) | |
| H01R 13/52 | (2006.01) | |
| H01R 13/523 | (2006.01) | |
| H02G 15/013 | (2006.01) | |
| H02G 15/04 | (2006.01) | |

(52) U.S. Cl.
CPC ......... *G02B 6/3816* (2013.01); *G02B 6/4428* (2013.01); *H01R 13/523* (2013.01); *H01R 13/5205* (2013.01); *H02G 15/013* (2013.01); *H02G 15/04* (2013.01); *G02B 6/3865* (2013.01); *G02B 6/3887* (2013.01)

(58) Field of Classification Search
CPC .. G02B 6/3816; G02B 6/3865; G02B 6/3867; G02B 6/3887; H02G 15/007; H02G 15/043; H02G 15/013; H02G 15/04; H01R 13/523; H01R 13/52; H01R 13/5205; H01R 13/521; H01R 13/5216; H01R 13/5221; H01R 13/5227
See application file for complete search history.

(56) References Cited

U.S. PATENT DOCUMENTS

| | | |
|---|---|---|
| 2,082,489 A | 6/1937 | Goldsmith |
| 2,634,923 A | 4/1953 | Taylor, Jr. |
| 3,158,379 A | 11/1964 | Nava et al. |
| 3,324,449 A | 6/1967 | McLoad |
| 3,445,580 A | 5/1969 | Lusk |
| 3,508,188 A | 4/1970 | Buck |
| 3,522,576 A | 8/1970 | Cairns |

(Continued)

FOREIGN PATENT DOCUMENTS

| | | |
|---|---|---|
| EP | 0229102 B1 | 7/1987 |
| WO | 2014195239 A1 | 11/2014 |

*Primary Examiner* — John M Bedtelyon
(74) *Attorney, Agent, or Firm* — Marc S. Kaufman; Mark T. Vogelbacker

(57) ABSTRACT

The cable termination may include a housing and a cable having at least one conductor disposed within the housing with an elastomeric body disposed in the housing and constrictively stretched over a portion of the cable. A retainer may be disposed around a portion of the cable for retaining the elastomeric body on the cable. The cable termination may also include an enclosure capable of changing volumetrically in response to fluctuating pressure disposed in the housing and around a portion of the cable.

26 Claims, 4 Drawing Sheets

(56) References Cited

U.S. PATENT DOCUMENTS

| | | | |
|---|---|---|---|
| 3,643,207 | A | 2/1972 | Cairns |
| 3,729,699 | A | 4/1973 | Briggs et al. |
| 3,772,636 | A | 11/1973 | Webb |
| 3,845,450 | A | 10/1974 | Cole |
| 3,877,775 | A | 4/1975 | Barlow |
| 3,946,805 | A | 3/1976 | Peterman |
| 3,963,297 | A | 6/1976 | Panek et al. |
| 4,085,993 | A | 4/1978 | Cairns |
| 4,142,770 | A | 3/1979 | Butler, Jr. et al. |
| 4,188,084 | A | 2/1980 | Buresi et al. |
| 4,373,767 | A | 2/1983 | Cairns |
| 4,390,229 | A | 6/1983 | Chevalier |
| 4,523,899 | A | 6/1985 | Ouchi |
| 4,529,257 | A | 7/1985 | Goodman |
| 4,588,247 | A | 5/1986 | Grappe et al. |
| 4,606,603 | A | 8/1986 | Cairns |
| 4,626,067 | A | 12/1986 | Watson |
| 4,666,242 | A | 5/1987 | Cairns |
| 4,795,359 | A | 1/1989 | Alcock et al. |
| 4,859,196 | A | 8/1989 | Durando et al. |
| 4,940,416 | A | 7/1990 | Wagaman et al. |
| 4,948,377 | A | 8/1990 | Cairns |
| 5,171,158 | A | 12/1992 | Cairns |
| 5,194,012 | A | 3/1993 | Cairns |
| 5,203,805 | A | 4/1993 | Cairns |
| 5,334,032 | A | 8/1994 | Myers et al. |
| 5,344,337 | A | 9/1994 | Ritter |
| 5,410,104 | A | 4/1995 | Gretz et al. |
| 5,458,507 | A | 10/1995 | Colescott et al. |
| 5,484,296 | A | 1/1996 | Taylor |
| 5,558,296 | A | 9/1996 | Sasaki et al. |
| 5,577,926 | A | 11/1996 | Cox |
| 5,645,438 | A | 7/1997 | Cairns |
| 5,645,442 | A | 7/1997 | Cairns |
| 5,685,727 | A | 11/1997 | Cairns |
| 5,722,842 | A | 3/1998 | Cairns |
| 5,738,535 | A | 4/1998 | Cairns |
| 5,899,765 | A | 5/1999 | Niekrasz et al. |
| 6,196,854 | B1 | 3/2001 | Hand |
| 6,315,461 | B1 | 11/2001 | Cairns |
| 6,332,787 | B1 | 12/2001 | Barlow et al. |
| 6,464,405 | B2 | 10/2002 | Cairns et al. |
| 6,561,268 | B2 | 5/2003 | Jones |
| 6,736,545 | B2 | 5/2004 | Cairns et al. |
| 6,796,821 | B2 | 9/2004 | Cairns et al. |
| 6,929,404 | B2 | 8/2005 | Jones et al. |
| 7,112,080 | B2 | 9/2006 | Nicholson |
| 7,182,617 | B1 | 2/2007 | Cairns et al. |
| 7,285,003 | B2 * | 10/2007 | Cairns ............... H01R 13/6272 439/353 |
| 7,344,316 | B2 | 3/2008 | McKinnon |
| 7,364,448 | B2 | 4/2008 | Cairns et al. |
| 7,429,193 | B2 | 9/2008 | Cairns et al. |
| 7,464,728 | B2 | 12/2008 | Cairns |
| 7,690,936 | B1 | 4/2010 | Snekkevik et al. |
| 7,695,301 | B2 | 4/2010 | Mudge, III et al. |
| 7,769,265 | B2 | 8/2010 | Cairns |
| 7,794,254 | B2 | 9/2010 | Marklove et al. |
| 8,192,089 | B2 | 6/2012 | Cairns et al. |
| 8,292,645 | B2 | 10/2012 | Cairns |
| 8,324,502 | B2 | 12/2012 | Kameda et al. |
| 8,376,765 | B2 | 2/2013 | Chaize |
| 8,702,439 | B1 | 4/2014 | Paulsel et al. |
| 8,731,362 | B2 | 5/2014 | Cairns |
| 8,731,363 | B2 | 5/2014 | Cairns |
| 8,816,196 | B2 | 8/2014 | Williams et al. |
| 8,899,841 | B2 | 12/2014 | Cairns |
| 8,944,082 | B2 | 2/2015 | Cairns |
| 9,116,323 | B2 | 8/2015 | Cairns |
| 9,263,824 | B2 | 2/2016 | Cairns |
| 2002/0123256 | A1 | 9/2002 | Brickett |
| 2003/0139087 | A1 | 7/2003 | Sprunger |
| 2008/0113543 | A1 | 5/2008 | Tsuji et al. |
| 2008/0274636 | A1 | 11/2008 | Marklove et al. |
| 2009/0025977 | A1 | 1/2009 | Anderson et al. |
| 2011/0005839 | A1 | 1/2011 | Marchand et al. |
| 2014/0024250 | A1 | 1/2014 | Spencer et al. |
| 2014/0096992 | A1 | 4/2014 | Williams et al. |
| 2014/0270674 | A1 | 9/2014 | Cairns |

* cited by examiner

CABLE TERMINATION

CROSS-REFERENCE TO RELATED APPLICATION

This application claims the benefit under 35 U.S.C. §119 (e) of the earlier filing date of U.S. Provisional Patent Application No. 62/186,605 filed on Jun. 30, 2015, the disclosure of which is incorporated by reference herein.

FIELD OF THE INVENTION

Embodiments of this invention relate generally to methods and apparatus for sealably joining cables to other devices for use in harsh environments such as seawater.

BACKGROUND OF THE INVENTION

There are a great many harsh environment applications in which cables carrying electrical and/or fiber-optical conductors are used to network submersible devices such as pumps, motors, and environmental sensors. In these applications, the cables are usually either terminated directly to the devices, or are terminated to connectors which then connect to the devices.

The term "cable termination" as used herein consists of the union between a cable's conductive elements and the respective conductive elements of a connector or other appliance to which the cable is attached. For convenience the part to which the cable is joined will hereinafter simply be called a "connector" with the understanding that it could be any sort of device. In harsh environments such as that found in sewers, ponds, or in seawater, for example, cable terminations are used to attach waterproof cables to submersible connectors.

The most widely used type of harsh-environment electrical cable termination consists of a cable-connector junction over-molded with a resilient material such as neoprene, polyurethane, or polyethylene. The over-mold renders the union impermeable to the exterior environment and protects it from mechanical damage. Over-molded terminations have the disadvantages that they must be made in a clean, controlled laboratory environment and require specialized chemicals, molds and other equipment. Under some conditions molded terminations also suffer from de-lamination of the bonds that bind and seal them to the other components. Representative examples of such terminations can be found in the open literature of major underwater connector manufacturers such as Seacon, Teledyne Impulse, Kemlon, and several others. Over-molded terminations generally represent old art.

A second sort of harsh environment electrical termination is completely mechanical, relying on layered elastomeric seals to protect the conductor junctions. Representative examples of this sort of termination are found in U.S. Pat. Nos. 7,182,617, and 7,690,936. This type of termination is field installable and repairable without specialized equipment; however, its use is restricted to very light-duty operations because there are no provisions to keep cable torque, bending, compression, or tension from working directly on the conductor junctions.

Another, more robust, type of harsh-environment cable termination houses the joined conductive elements of the cable and connector in a pressure-compensated chamber that is filled with a mobile substance. These terminations are installable and repairable in the field without the need of chemicals, molds or other specialized appliances. Pressure compensating the terminations relieves much of the stress on the conductor junctions, and reduces the possibility of environmental fluid intruding into the termination. Historically the mobile substance used in these terminations has been a dielectric grease, gel, or oil. More recently, lubricious powders have been proposed as the mobile substance, as in U.S. Pat. Nos. 9,116,323 and 8,899,841. For convenience in this document the mobile substance will simply be called fluid or oil, with the understanding that it could be any suitable material that remains mobile over the termination's entire operating ranges of lifetime, temperature and pressure. Typical examples of prior art fluid-filled terminations are disclosed in U.S. Pat. Nos. 3,877,775, 4,039,242, 4,673,231, 4,940,416, 6,796,821, 7,182,617, 7,429,193 and 7,614,894, and in foreign patent EP2252442. A cursory review of fluid-filled termination prior art reveals its ubiquitous complexity.

Components commonly used in oil-filled cable terminations include a flexible portion of the compensation chamber's wall that allows the chamber to adjust for volume and pressure changes. In terminations wherein the bitter ends of cables enter the oil-filled compensation chamber, breakout boot seals are often used to seal the interfaces where individual conductors issue from the cable's end. In addition to providing an isolative layer around otherwise exposed portions of electrical conductors, boot seals are intended to keep the chamber oil from escaping into the cable's interstices. Such oil loss can quickly lead to chamber collapse and catastrophic termination failure. As discussed in U.S. Pat. No. 6,796,821, prior art elastomeric breakout boot seals are easily displaced from their sealing positions, particularly in applications wherein there is rough handling or an overpressure of mobile material within the cable itself that might extrude into the boot seal and push it out of sealing engagement or even completely off of the cable's end.

There remains a need for a fluid-filled termination whose breakout boot seals remain in sealing position on the cable end to which they are installed, even in the case where there is an unseating overpressure within the cable itself.

The invention disclosed herein is a field-installable, removable, and repairable cable termination of the fluid-filled type. It integrates a breakout boot seal and a flexible-walled fluid chamber enclosure into a unified component, thereby yielding an assembly which is much simpler than prior art terminations. The assembly includes a pressure relief feature which vents any mobile material extruded from the cable's end into the outside environment, and not into the compensation oil chamber. It also includes two unique methods for managing optical fibers within the termination. The disclosed embodiments are for a simple unarmored marine cable-to-connector termination, but it will be obvious to those familiar with the art that it can equally well be adapted for more complex applications such as for armored cables. The invention should find use in a wide variety of applications wherein the high reliability of fluid-filled, field-installable and repairable terminations is required.

SUMMARY OF THE INVENTION

A harsh environment cable termination is provided which can be installed, tested, and if necessary, repaired in the field prior to submersion. The invention is described as a simple assembly that sealably joins one cable to one underwater connector. Although the invention is disclosed in that simple arrangement, it will be clear that it can be configured for joining a wide variety, size, and number of diverse components.

In the invented termination the cable is mechanically attached to the connector by way of a grip in the rear portion of an elongated shell, which shell, in turn, is mechanically attached on its forward end to a connector body. The shell forms a protective barrier for the more vulnerable portions of the termination contained within it. A flexible-walled fluid-filled chamber encloses the union between a cable's electrical and/or optical fiber conductive elements and the respective conductive elements of the connector. The chamber's flexible walled enclosure is exposed to the in-situ environment, allowing the fluid pressure within the chamber to change with changing outside pressure, and to volumetrically expand or contract due to temperature and pressure changes. A cable-end breakout boot seal is integrally formed as part of the flexible-walled chamber enclosure, thereby greatly simplifying the architecture of the termination. The breakout boot seal is kept in place by a positive mechanism that retains it on the cable's end. The unified chamber enclosure and breakout boot seal structure includes a pressure relief feature that vents cable internal overpressure to the outside environment. The device is quickly and easily installable, and if necessary, removable and reparable in the field with no special training or tools. At the same time, the integrated chamber enclosure and breakout boot seal eliminate some of the potential leak paths and other failure modes inherent in more complex prior-art terminations. The economy and ease of installation, without need of laboratory conditions, should favor the use of the invention over traditional over-molded terminations in a wide variety of applications.

BRIEF DESCRIPTION OF THE DRAWINGS

The details of the invention, both as to its structure and operation, may be gleaned in part by study of the accompanying drawings, in which like reference numerals refer to like parts, and in which.

DETAILED DESCRIPTION OF THE INVENTION

Figure 1:
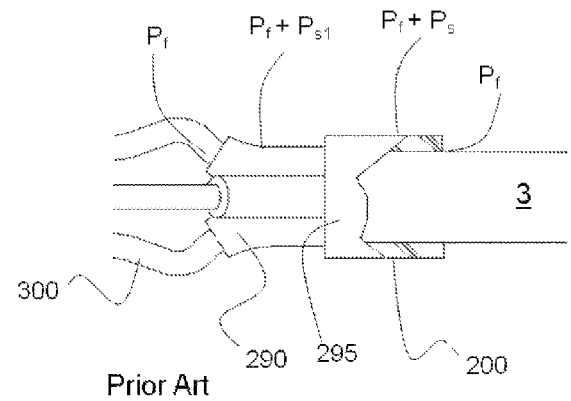
FIG. 1 illustrates a prior art breakout boot seal.

U.S. Patent Application 62/156,371 entitled "Boot Seal," is incorporated herein by reference. A typical prior-art cable-end, elastomeric, breakout boot seal is shown in FIG. 1. It consists of a sleeve portion 200 which is constrictively stretched over the end of cable 3. The environmental fluid pressure $P_f$ has the effect of unseating the rear portion of sleeve 200; however, there is a pressure $P_f+P_s$, where $P_s$ is the "stretch" pressure of the constrictive elastomer upon cable 3. The stretch pressure works in cooperation with the environmental pressure to keep the sleeve seated. Since $(P_f+P_s) \geq P_f$ in all cases, the rearward portion of sleeve 200 will not be unseated by environmental fluid pressure $P_f$, and the seal will not fail in that mode no matter how great the environmental fluid pressure. The same reasoning is true for all elastomeric boot seals wherein there is adequate stretch to conformably seat the sealing sleeve to the object over which it is stretched.

Individual sleeves 290, which are integrally molded onto heavy end-wall 295 of sleeve 200, stretch over individual cable jacketed conductors 300. The same mechanism that worked to keep the interface between sleeve 200 and cable 3 sealed, keeps the interfaces between sleeves 290 and conductor jackets 300 sealed; that is, $(P_f+P_{s1}) \geq P_f$, where $P_{s1}$ is the stretch pressure that constrictive sleeves 290 exert on respective conductors 300. It is therefore clear that no matter how great fluid pressure $P_f$ is, the various interfaces will remain sealed against it.

As discussed in U.S. Pat. No. 6,796,821, prior art elastomeric breakout boot seals like that shown in FIG. 1 can be easily displaced and unseated, particularly if there is an overpressure within cable 3 to which they are attached. Looking still at FIG. 1, it is clear that if appreciable pressure developed within cable 3, as might occur from out-gassing of material within cable 3, for instance, the FIG. 1 boot seal would simply be pushed off of the end of cable 3. Such cases are more likely when the opposing environmental fluid pressure $P_f$ is small. In the case of subsea cables, that means either when the cable is not yet submerged, or when it is in shallow water. There are process-type breakout boot seals, such as those manufactured by Tyco-Raychem, which sealably adhere to the cable, and are not as easily displaced. But using process-type boot seals is not always practical; for instance, when the cable jacket cannot be adhered to, or when the seal must be installed in conditions detrimental to the sealing process.

The invented termination is disclosed herein in two embodiments, both of which utilize breakout boot seals that are retained in place on the ends of the cables onto which they are installed. The first embodiment incorporates a breakout boot seal construction as disclosed in U.S. Patent Application 62/156,371. In the '371 construction the breakout boot seal includes a mechanism that grips directly onto the cable being terminated. The second embodiment does not grip directly onto the cable; instead, it is retained by standoff-rods that cooperate with one retainer washer external to the breakout boot seal, and another washer internal to the breakout boot seal.

First Embodiment

Figure 2:
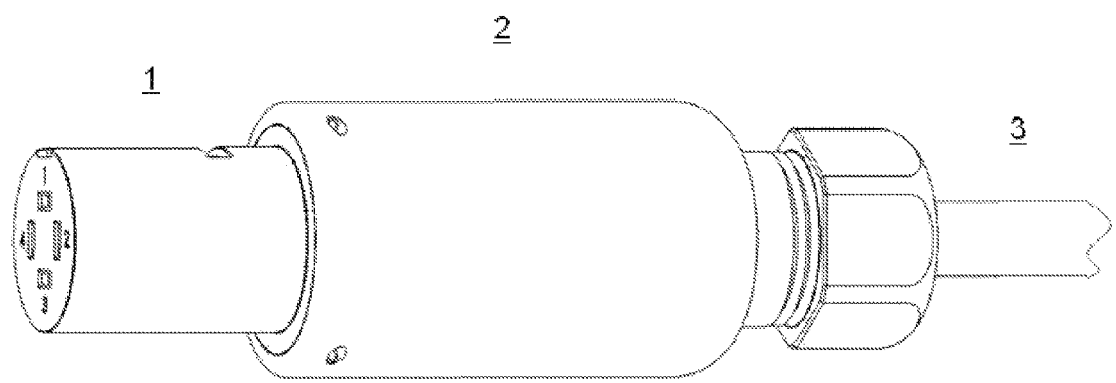
FIG. 2 is an oblique view of the invented termination joining an underwater connector on one end, and a simple unarmored cable on the other end.
Figure 3:
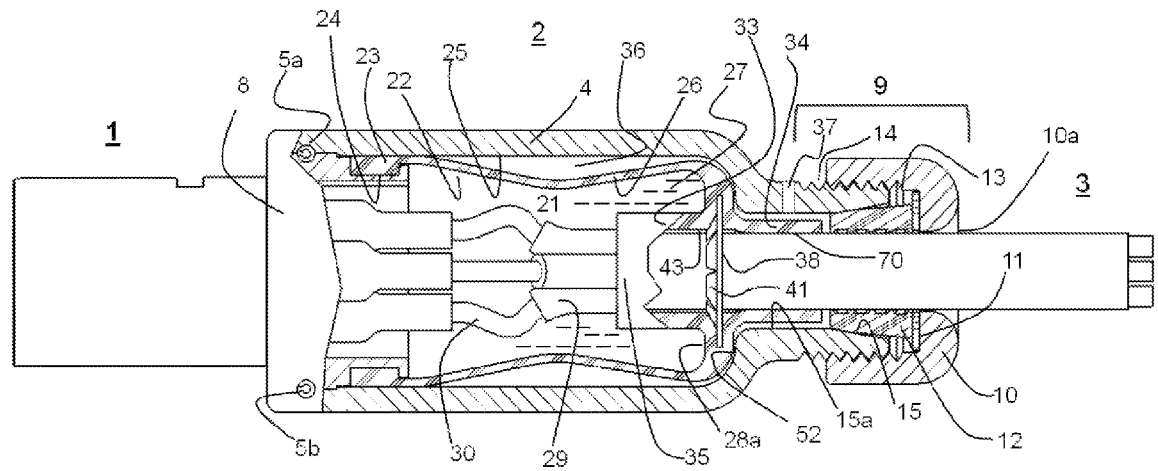
FIG. 3 is a partially sectioned axial view of the termination assembly of FIG. 2.
Figure 4:
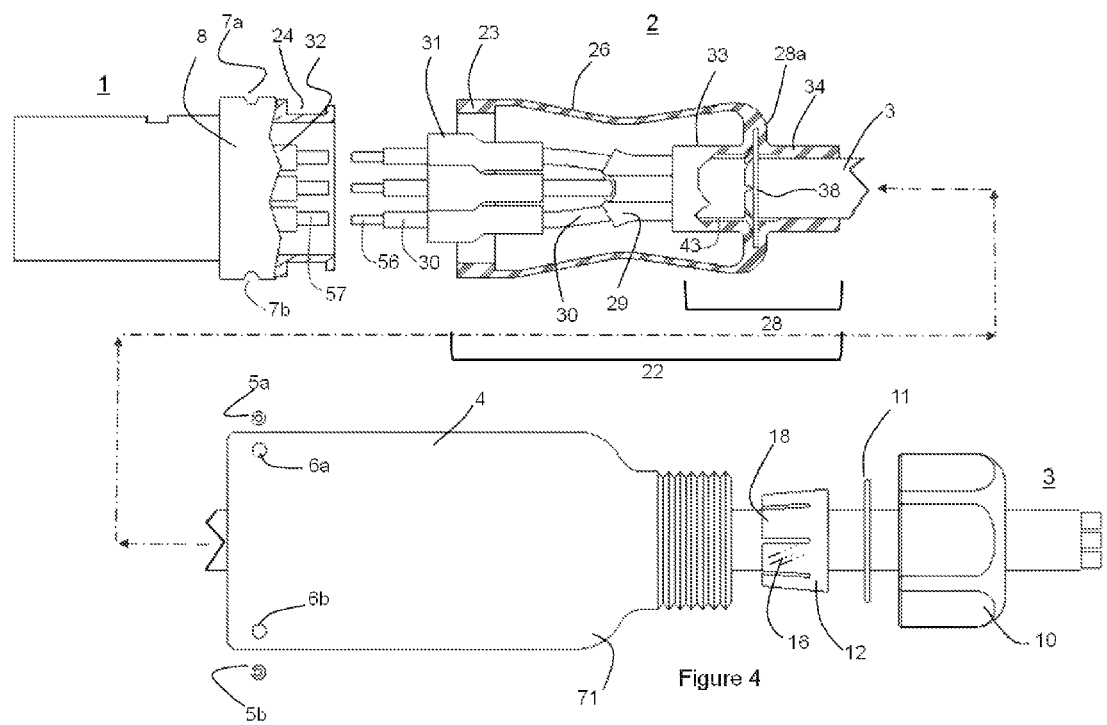
FIG. 4 is an exploded view of the termination assembly of FIG. 2.

FIG. 2 is an overall oblique view of invented termination 2 used to join connector 1 to cable 3, and FIG. 3 is a partially sectioned view of the assembly shown in FIG. 2. FIG. 4 is a partially sectioned exploded view of the assembly shown in FIG. 2.

Looking now at FIGS. 3 and 4, underwater connector 1 is mechanically joined to the forward end of termination shell 4 by spring pins 5a and 5b. Pins 5a and 5b seat in respective through holes 6a and 6b in termination shell 4, and in respective slots 7a and 7b in connector back shell 8, thereby both rotationally and axially locking termination shell 4 to connector 1. Cable 3 passes into the rearward portion of termination shell 4 through cable grip assembly 9. Connector 1, shell 4, and grip assembly 9 altogether form the termination's protective housing. Shell 4 may be made of any substantially rigid material such as hard plastic or metal that is suitably rugged for the intended application.

Figure 6:
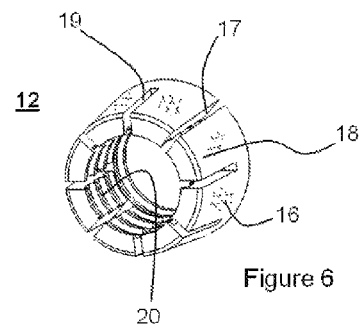
FIG. 6 illustrates a cable grip.

Cable grip assembly 9 comprises retainer nut 10, washer 11 and cable grip 12. Cable grip 12 may be made of a hard but somewhat flexible material such as Ryton® PPS (polyphenylene sulfide). Threads 13 on retainer nut 10 cooperate with threads 14 in the rearward end of termination shell 4 to contain cable grip assembly 9 within conical bore 15a of termination shell 4. Retainer nut 10 has an oversized through bore 10a which is slightly larger than the outer diameter of cable 3, and therefore does not seal to cable 3. Tightening retainer nut 10 tightly presses the elements comprising cable grip assembly 9 into conical bore 15a of inner diameter 15 of termination shell 4, forcing the exterior conical surface of cable grip 12 axially into conical bore 15a. A roughened exterior surface 16 of cable grip 12 (FIG. 6) is forced against roughened surface (not shown) of conical bore portion 15a of termination shell 4 to rotationally lock cable grip assembly 9 to termination shell 4. Cable grip 12 is split through axially by slot 17, causing it to compress radially when forced axially inward against conical bore 15a. Cable grip 12 is also partially segmented into individual tines 18 separated by slots 19 which facilitate its radially inward compression, and which cause radial ridges 20 to bite into the exterior of cable 3 thereby gripping cable 3. No element of cable grip assembly 9 seals against cable 3; instead, in-situ environmental fluid is free to flow through it into and out of the interior of termination shell 4.

Figure 13:
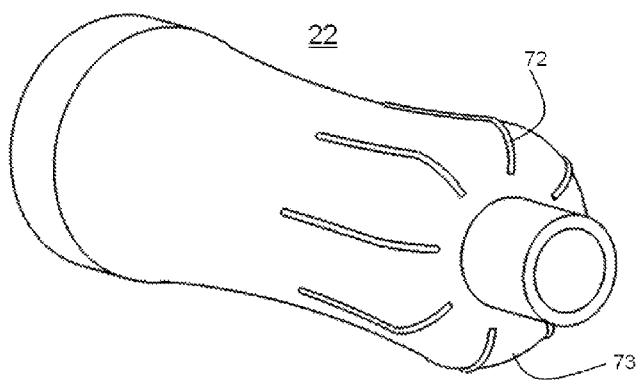
FIG. 13 is an external view of the unified chamber housing showing ventilation ribs.

One advantage of the invention is that all of the elastic portions enclosing fluid chamber 21 are integrated into a single unified part: chamber enclosure 22 (FIG. 13). Depending on the particular application, chamber enclosure 22 may be made of an elastomer which is chemical compatible with the other elements of the termination with which it is in contact. In some cases neoprene would be acceptable, for instance, or natural rubber. Fluid chamber 21 is defined by chamber enclosure 22, connector 1 and cable 3 as follows: The forward end of fluid chamber 21 is closed by the (hidden) rear wall of connector 1. Inward facing shoulder 23 of chamber enclosure 22 seals into seat 24 of connector 1. Shoulder 23 is held sealable into seat 24 by inner wall 25 of termination shell 4. Generally tubular wall 26 of chamber enclosure 22 housing fluid 27 extends backward from inward facing shoulder 23 into heavy walled portion 28a of integrally molded breakout boot seal portion 28. Breakout boot seal sleeves 29 sealably stretch over jacketed conductors 30. Other boot seals 31 sealably stretch over the terminal ends of jacketed conductors 30 and over boot seal nipples 32 of connector 1. Sleeves 33 and 34 extend back along cable 3 from end wall 35 of boot seal portion 28 thereby completely enclosing fluid chamber 21. Fluid chamber 21 is thus defined and sealed.

Note that cable 3 does not enter fluid chamber 21; only the individual jacketed conductors 30 enter fluid 27 within fluid chamber 21. Space 36 surrounding the outside of chamber enclosure 22 and inside of termination shell 4 is open to the in situ environment, for instance seawater, which is free to pass through cable grip assembly 9 and thence through the space between inner diameter 15 of shell 4 and the outer diameter of sleeve 34. Ventilation through cable grip assembly 9 takes place by way of axial slots 17 and 19 of cable grip 12 and the oversized central bore 10a of retainer nut 10.

Means other than the ventilation through cable grip assembly 9 can be provided if needed; for example, one or more vent holes 37 could be added. Tubular wall 26 of chamber enclosure 22 allows changes of the in-situ environmental pressure outside of chamber enclosure 22 to be transmitted to fluid 27 as the in-situ pressure increases and decreases.

Figure 5:
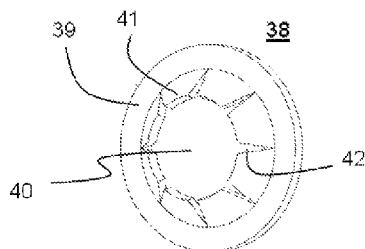
FIG. 5 illustrates a retaining device.

Although more than one way can be envisioned for retaining breakout boot seal portion 28 of chamber enclosure 22 in place on the end of cable 3, in the first described embodiment it is accomplished by a retainer 38 in the form of a push-nut type fastener, shown also in FIG. 5, which is integrally molded or inserted into thick-walled portion 28a of boot seal portion 28 of chamber enclosure 22. Post-mold insertion of retainer 38 is possible due to the elasticity of boot seal portion 28. Retainer 38 can be made from rigid flexible material such as thin metal or hard plastic which keeps boot seal portion 28 in place on cable 3. Retainer 38 does not rely on bonding or any other chemical processes. Push-nut fasteners such as retainer 38 are widely available commercially, for instance from ARaymond Tinnerman.

Referring to FIG. 5, retainer 38 includes a circular peripheral body 39. Extending axially through body 39 is a central opening 40. Opening 40 has a generally circular configuration and has an inner marginal periphery that is defined by a plurality of individual tab-like extensions or tines 41. The tines 41 are inclined radially inwardly from body 39 and cooperate to define a conical shape about the margin of opening 40. Tines 41 are separated from one another by recesses 42. Note that recesses 42 represent openings that keep retainer 38 from sealing to the outside surface of cable 3. Referring now to FIG. 3, the distal ends of tines 41 of retainer 38 forming opening 40 are disposed at a diameter which is less than the inner diameter 43 of heavy walled portion 28a of boot seal portion 28, and somewhat less than the outer diameter of cable 3. Inner diameter 43, in turn, is greater than the outer diameter of cable 3 thereby allowing distal tines 41 to project inward from inner diameter 43 to effectively grip cable 3.

There's another advantage to having inner diameter 43 of boot seal portion 28 slightly larger than the outer diameter of cable 3. It is that sleeve portion 33 does not constrictively seal to cable 3 along inner diameter 43. As an added measure to ensure that sleeve 33 does not seal to cable 3 along inner diameter 43 of boot seal portion 28, axial ribs (not shown) along inner diameter 43 can be provided. Ventilation between inner diameter 43 of boot seal portion 28 and the outer surface of cable 3 is important, because, as will soon be discussed, it provides that any material issuing from the end of cable 3 due to an overpressure within the cable can be made to migrate to sleeve 34 of boot seal portion 28 where it will subsequently be discharged.

The main function of retainer 38 is to keep chamber enclosure 22 in place on the end of cable 3. Retainer 38 forms a one-way axial grip onto cable 3, allowing cable 3 to be pressed through retainer 38 from the rearward end, but not to be subsequently withdrawn from it. Tines 41 on retainer 38 are angled forward, and can be deflected radially outward by the rearward entering cable. During assembly, retainer 38 permits chamber enclosure 22 to be pushed onto the end of cable 3, with conductors 30 being fed through sleeves 29. Once pushed into place on the end of cable 3, retainer 38 keeps chamber enclosure 22 from subsequently being forced off of the end of cable 3.

Figure 7:
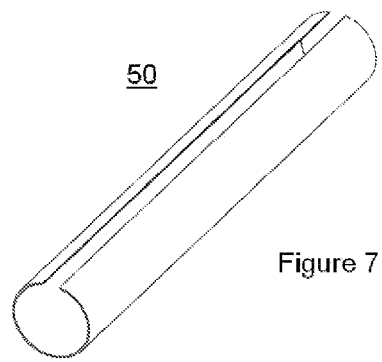
FIG. 7 depicts a boot seal removal tool.

If for some reason chamber enclosure 22 needs to be removed from cable 3, a thin, split, flexible tube 50 such as shown in FIG. 7 can be slid from the rear under both sleeve 34 and retainer 38 to displace tines 41 outwardly, freeing cable 3. Tube 50 can be cut and rolled from suitable thin sheet material.

Chamber enclosure 22 is formed with a relatively thin walled, tubular portion 26 which extends radially outward from thicker walled portion 28a, and then extends forward in a generally tubular shape that terminates on its forward end in inward protruding shoulder 23. Sleeve 33 extends forward of thicker-walled portion 28a, and terminates in a relatively thick end wall 35. Sleeves 29 extend forward from end wall 35, with the bores of sleeves 29 continuing rearward through wall 35. Sleeve 34 of chamber 22 extends rearward constrictively over cable 3 from a point rearward of retainer 38.

Retainer 38 keeps breakout boot seal portion 28 of chamber enclosure 22 in place against modest pressure internal to cable 3. Both the jacket of cable 3 and thicker walled portion 28a of boot seal portion 28 of chamber enclosure 22, being of resilient material, have some limitations regarding the retaining ability of retainer 38. The retaining ability can be enhanced by having multiple retainers 38 spaced axially along cable 3, but it still will be limited. The retention of boot seal portion 28 of chamber enclosure 22 onto the end of cable 3 can also be enhanced by relieving any cable 3 internal overpressure at a low level.

Figure 8:
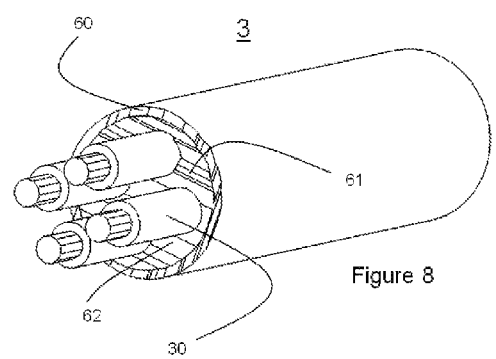
FIG. 8 shows the construction of a typical subsea cable.
Figure 9:
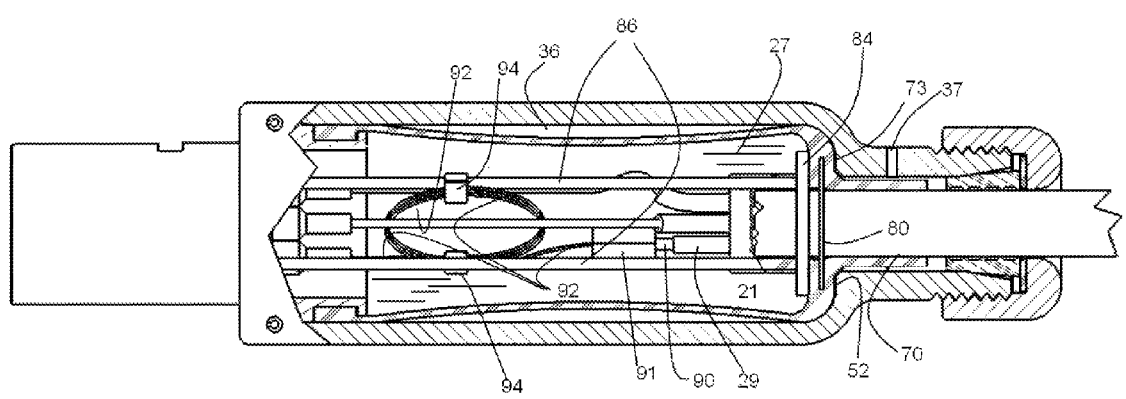
FIG. 9 is a partially sectioned axial view of an alternative embodiment of the termination assembly shown in FIG. 3.
Figure 10:
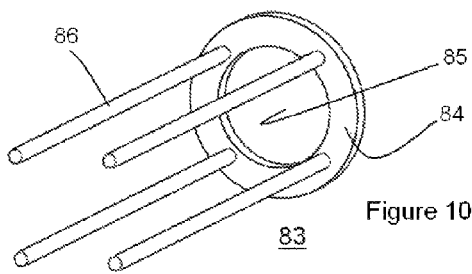
FIG. 10 is a standoff device.

To better understand internal cable pressure, consider FIG. 8 which shows one typical sort of underwater cable construction. It consists of outer cable jacket 60 and inner jacketed conductors 30. The space 61 between jacketed conductors 30 and outer cable jacket 60 contains a filler 62 which may or may not be porous. In any case, pressure can build up along the interfaces between jacketed conductors 30 and filler 62, and/or within the interface between outer cable jacket 60 and the filler 62, and in the case of a porous filler, within filler 62 itself. Said more succinctly, pressure can possibly build up anywhere within space 61 between jacketed conductors 30 and outer cable jacket 60. The internal pressure within cable 3 may increase due to a variety of mechanisms. For example, the plastic jackets of jacketed conductors 30 within cable 3 can continue to outgas as they age, thus creating an internal pressure inside cable 3; or mobile substances such as gel fillers or intruded water can migrate within cable 3 due to handling, also potentially increasing pressure in cable 3 within space 61. When the internal cable pressure exceeds a desired level, it is advisable to provide a release path to relieve the pressure without damaging or unseating boot seal portion 28 from cable 3.

In general, when the overpressure internal to a boot seal sleeve reaches a certain level it causes the boot seal sleeve to expand radially, allowing gas or fluid inside of it to leak outward along the interface between it and the object over which it is stretched; however, environmental fluid will still not leak in. Boot seal sleeves make effective one-way pressure relief valves, for which they are frequently used.

Referring now to FIG. 3, in fluid-filled cable terminations any cable 3 internal overpressure should be relieved rearwardly along the external surface of cable 3 through the interface 70 between cable 3 and sleeve 34, and not forwardly into fluid chamber 21. That can be accomplished by designing the stretch pressure of boot seal sleeve 34 on cable 3 to be much less than that which any of boot seal sleeves 29 exert on the jacketed conductors 30 over which they are constrictively stretched. In that case, any material forced outward from the cable 3 interior will pass out under sleeve 34 via path 70 and thence into the external environment, and not into fluid chamber 21.

One simple way to control the stretch pressure on any elastomeric sleeve is by increasing or decreasing its wall thickness and/or inner diameter. Thicker walls and/or smaller inner diameter sleeves exert more stretch pressure on the objects over which they are stretched, and thinner wall thicknesses and/or larger internal sleeve diameters exert less stretch pressure.

In pressure-balanced fluid-filled terminations it is typically assumed that the fluid pressure within the chamber is approximately equal to the pressure outside of the chamber due to the easy transmission of the outside pressure to the fill fluid. The discussion is always couched in terms of the pressure within the fluid chamber adjusting to the external in-situ pressure. It is not discussed in terms of the outside environmental pressure adjusting to the pressure in the fluid chamber, because that cannot happen; the outside environment is of infinite volume for all practical purposes.

However, there are some non-trivial cases in which the pressure within the chamber can exceed the outside environmental pressure. For instance, there is nearly always some air left in the fluid chamber during assembly. Subsequently the entrapped air can expand in the case where the in-situ pressure is relatively low, such as when a fluid-filled termination is transported at high altitude, or when it's exposed to high temperatures. In a termination having no means to contain expansion of its compensation chamber, the pressurized entrapped air could displace the compensation chamber enclosure out of sealing position; or worse, it could rupture the chamber enclosure out through the vent passages found in most prior art terminations.

The invented termination is designed to prevent those potential failures. Over-pressure within chamber enclosure 22 will cause chamber enclosure 22 to expand to fill the large diameter, rear, bell shaped portion 71 of termination shell 4, which keeps chamber enclosure 22 from expanding further. There are no vent holes in shell 4 that are positioned in such a way that the walls of chamber enclosure 22 could extrude and rupture through them. Pressure from the expanding air will force heavy-walled portion 28a of chamber enclosure 22 against end wall 52 of termination shell 2. Note that the outer diameter of retainer 38 is greater than the rearward inner diameter 15 of termination shell 4. Rearward expansion of chamber enclosure 22 is thus arrested by the interference of retainer 38 and end wall 52. The expansion of chamber 21 is therefore limited in every direction rendering it undamaged and in place in the presence of over-pressure within fluid chamber 21.

Ribs 72 seen in FIG. 13 on the rearward bell-shaped wall 73 of chamber enclosure 22 guarantee that rear exterior wall 73 of chamber enclosure 22 will not seal to rear wall 52 of termination shell 4 when pressed against it. Ventilation between space 36 exterior to tubular portion 26 of chamber enclosure 22 and the external environment takes place along the ribbed portion of exterior wall 73, thence through the space between the outside diameter of sleeve 34 and inner diameter 15 of shell 4, and onward through slots 17, 19 of cable grip 12 and finally through the oversized bore 10a of retainer nut 10.

The procedure for installing the termination is easily understood from FIG. 4. Nut 10, washer 11, cable grip 12 and termination shell 4 are slid backward onto cable 3 in the order shown. The end of cable 3 is prepared by cutting back the outer jacket and filler material to expose lengths of jacketed conductors 30. If not already molded in place, retainer 38 is inserted into chamber enclosure 22. Slight lubrication of the various parts facilitates installation. Next, jacketed conductors 30 are fed through sleeves 29 of chamber enclosure 22, and cable 3 is pushed into chamber enclosure 22 until it butts against end wall 35. Thin walled portion 26 of chamber enclosure 22 is rolled back upon itself rearwardly to allow easier access to jacketed conductors 30. Boot seals 31 are slid rearwardly onto jacketed conductors 20 as far as possible. Jacketed conductors 30 are cut to proper length, and the electrical conductor jackets are cut back to expose conductor ends 56, which are then joined to the electrically conductive elements 57 of connector 1. The joining of conductors 56 to conductive elements 57 can take place in a variety of well known ways, such as soldering or crimping in the case of electrical conductors, or passage through penetrators in the case of optical fibers. Some clear examples of these ways can be found in U.S. patent application Ser. No. 13/296,406. Boot seals 31 are then slid forwardly into engagement with boot seal nipples 32. Cable 3 and connector 1 are held horizontally aligned at an axial separation distance that leaves space for a service bend in jacketed conductors 30 and/or the management of optical fibers. Next thin-walled, tubular portion 26 of chamber enclosure 22 is rolled forward. Inward facing shoulder 23 is then seated into seat 24 of connector 1. Still in a horizontal position, chamber enclosure 22 is now filled with fluid 27, such as oil, by pinching up the top portion of shoulder 23 from seat 24 and inserting a small tube under shoulder 23 through which a measured amount of fluid 27 is injected into chamber 21. Excess air is forced out as much as practical. Shoulder 23 is allowed to snap back into sealing position in seat 24. Termination shell 4 is then slid forward onto the rear of connector 1, and spring pins 5a, 5b are inserted. Cable grip 12, washer 11, and nut 10 are slid forward into the end of shell 4; nut 10 is tightened, and the termination is complete.

Second Embodiment

There are alternate ways that would be useful in some circumstances to retain chamber enclosure 22 including boot seal portion 28 in position relative to cable 3 within the termination assembly. As an example of such circumstances, the cable to be terminated might have an outer jacket that's too soft to be adequately held in place by a push-nut type fastener such as that just described. An alternate termination construction is shown in FIGS. 9-12 and 14. In this alternate embodiment plain washer 80 replaces retainer 38 of the earlier embodiment. Washer 80 is sized with an inner diameter slightly larger than the outer diameter of cable 3, and an outer diameter somewhat larger than inner diameter 15 of shell 4. Standoff 83 (FIG. 10) has a disc-shaped end 84 with through-hole 85 and standoff rods 86. Through-hole 85 is sized just slightly larger than the outer diameter of sleeve 33 of chamber enclosure 22. Standoff rods 86 are inserted into sockets (not shown) in the rear wall of connector 1. The heavy-walled portion 28a of chamber enclosure 22, including washer 80, is axially trapped loosely between disc-shaped end 84 of standoff 83 and end wall 52 of termination shell 4. It cannot move forward because of standoff 83; it cannot move backward because of end wall 52. Sleeve 33 is heavy so as to be robust and not easily stretched forward. Over-pressure within cable 3 is relieved, as before, backward under sleeve 34 via path 70 and further through grip assembly 9 and into the exterior environment. As in the earlier embodiment, ribs 72 on the rearward bell-shaped portion of chamber enclosure 22 guarantee that rear exterior wall 73 of chamber enclosure 22 will not seal to end wall 52 of termination shell 4 when pressed against it. Ventilation is thereby assured between space 36 exterior to tubular wall 26 of chamber enclosure 22 and the external environment.

Note that in the second embodiment, chamber enclosure 22 is not fastened directly to cable 3. That is the principal functional difference between the first and second embodiments. Cable 3 is mechanically held in place by cable grip 12, and chamber enclosure 22 is held in place axially by the entrapment of its heavy walled portion 28a including plain washer 80 against end wall 52 of termination shell 4 and disc-shaped end 84 of standoff 83. Assembly of this alternate embodiment is the same as in the first described embodiment except that one additional part, standoff 83, has been added to the assembly and retainer 38 has been replaced by plain washer 80. Apart from the modifications just described the second termination embodiment functions the same as the first one employing retainer 38.

In both of the embodiments just described the jacketed conductors 30 within the termination could be either optical fibers or electrical wires. In the case of optical conductors, the jackets could be protective tubes of material such as steel hypodermic tubing which, although rigid, is flexible enough to be embedded in a flexible subsea cable. Looking now at FIG. 9, optical fiber protective tube 90 passes out of cable 3, through the end wall 35 of boot seal portion 28 and thence through constrictive breakout boot seal sleeve 29 into fluid chamber 21. Within fluid chamber 21, optical fiber 92 is sealably passed out of tube 90 through a device such as fiber penetrator 91. Optical fiber protective tubes such as 90 are most often either gel filled or simply empty. The pressure within them is nominally one atmosphere. Fiber penetrator 91 permits optical fiber 92 contained therein to pass undamaged from the one atmosphere pressure interior of protective tube 90 into the possibly high pressure of fluid chamber 21 with no exchange of material between fluid chamber 21 and the interior of protective tube 90. Examples of fiber penetrators such as 91 can be found in U.S. Pat. Nos. 6,067,395 and 6,608,960.

Once into fluid chamber 21, excess amounts of optical fiber 92 can be managed in the well known way of winding flexible elongated elements into a figure-8 pattern as described in U.S. Pat. Nos. 2,634,923 and 2,082,489. The figure-8 pattern keeps long, thin, flexible elements whose ends are fixed from being twisted when coiled. U.S. Pat. Nos. 7,769,265 and 8,731,363 each describe winding tracks which facilitate winding optical fibers into the figure-8 pattern and which also serve as the mounting devices for the wound fiber coils. The '265 optical fiber management invention is for a winding spool and a method of employing the spool, whereas the '363 invention is for a winding apparatus upon which optical fibers are wound and stored.

A close study of the aforementioned patent-winding techniques, particularly as described in the '265 patent, makes it clear that the winding could equally well be done by hand without the need of any reels or spools. Optical fiber can be hand-wound into a simple coil in the case where the optical fiber has at least one free end, or into a flat figure-8 coil like that just described in the case where both fiber ends are fixed.

Figure 11:
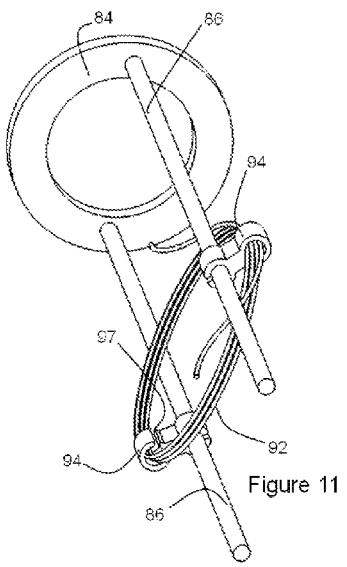
FIG. 11 is a view of isolated components showing an optical fiber managed in a flat coil.
Figure 12:
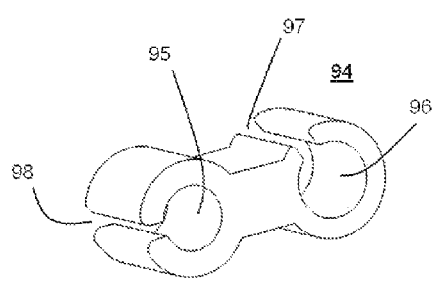
FIG. 12 illustrates a clip for managing optical fibers within the termination.

The method of fiber management described in the invention is much simpler. Optical fibers are simply hand wound into a flat coil without the use of any apparatus at all. The resulting fiber coil can then be clipped or otherwise retained in position within chamber enclosure 22. No reel, track or spool is required. FIG. 11 is a perspective view of isolated termination elements to clarify the fiber management technique. Diagonally opposed standoff rods 86 protrude forward from disc-shaped end 84 of standoff 83. Retainer clips 94, shown in FIG. 12, comprise a first through bore 95 sized to tightly fit onto standoff rod 86, and a second through bore 96 sized to accommodate one or more coils of optical fiber. Slot 98 in retainer clip 94 allows bore 95 to spring slightly outward during installation, thereby firmly gripping standoff rod 86 once installed. Installation of retainer clips 94 can take place by inserting them onto the ends of standoff rods 86 and sliding them into axial position. Slot 97 in clip 94 allows the fiber coil to be inserted into bore 96. Retainer clips 94 are installed so that slots 97 are oriented generally radially inward towards the longitudinal axis of termination shell 4. Optical fibers are very springy, and fibers in a circular loop will tend to spring radially outward from the loop's center. In the invention, that means they will spring radially outward and away from slots 97, and therefore will not escape from retainer clips 94 through slots 97. Clips 94 could be made in many different configurations that would work just as well as those shown.

Figure 14:
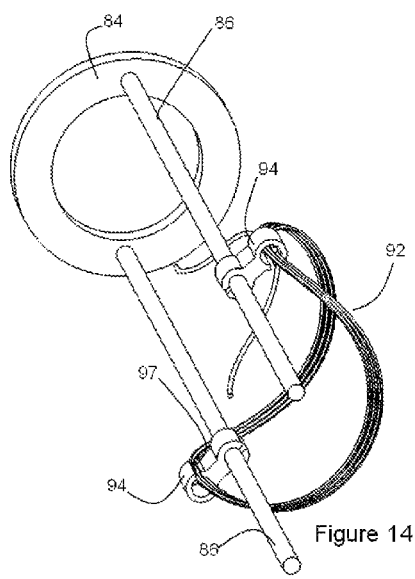
FIG. 14 is a view of isolated components showing an optical fiber managed in a curved coil.

As discussed in U.S. Pat. No. 8,731,363, in applications where space within the termination is very limited, it is advantageous to manage the optical fibers into a curved figure-8 arrangement. The '363 management apparatus arranges fiber loops on two curved tracks that are either side-by-side axially or opposed radially within the termination chamber. But, there is a much simpler and more compact method of managing the fiber coils into a curved arrangement. Once again, it relies on the spring characteristics of optical fiber. The hand-wound coil shown in FIG. 11 can be pinched radially into a curved coil as illustrated in FIG. 14. Diametrically opposed portions of the coil are inserted into retainer clips 94 and allowed to spring outwards towards their relaxed flat condition, but are constrained by the clips to remain curved. Note that the result is a more compact, single fiber coil, not the two coils required in the '363 patent.

The invention embodiments herein disclosed are seen to be much simpler than prior art fluid-filled and pressure-balanced cable terminations, and yet they have not sacrificed utility. The simplification enhances reliability by eliminating some of the prior art failure modes. For example, prior art terminations generally have many more sealed interfaces each of which is a potential leak path, and each potential leak path presents the possibility of failure. Assembly errors are diminished in the invented termination by the uncomplicated installation, which in part is due to its having many fewer components than prior art devices. The economical construction of the invention should enable the use of fluid-filled and pressure balanced terminations in a much wider range of electrical, fiber-optical, and hybrid applications than have heretofore been practical.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A cable termination for coupling conductive elements of a cable with a connector or other appliance, the cable including an outermost covering and at least one conductive element disposed within the outermost covering, the cable termination, comprising:
   a first housing having a first end and a second end;
   an elastomeric body disposed in the first housing and having a first portion defining an enclosure configured to retain a mobile substance within the enclosure and capable of changing volumetrically in response to fluctuating pressure, the elastomeric body having a second portion configured to sealably engage the outermost covering of an end portion of the cable and having passages configured to permit individual conductive elements of the cable to sealably extend into the enclosure, whereby the outermost covering does not extend into the enclosure; and
   a retainer in cooperative engagement with the elastomeric body and disposed around the end portion of the cable for retaining the elastomeric body on the cable.

2. The cable termination of claim 1 wherein the first portion and the second portion of the elastomeric body are a single integrated member.

3. The cable termination of claim 1 wherein the second portion of the elastomeric body comprises a first sleeve configured to receive at least part of the end portion of the cable and a second sleeve, wherein the passages are formed in the second sleeve.

4. The cable termination of claim 3 wherein the passages comprise at least one conductor sealing sleeve configured to receive at least one of the conductive elements.

5. The cable termination of claim 4 wherein the second portion of the elastomeric body is adapted to relieve cable internal overpressure through a release path.

6. The cable termination of claim 5 wherein the release path extends rearwardly along an interface between the cable and the first sleeve.

7. The cable termination of claim 6 wherein the second sleeve has an inner diameter which is larger than an inner diameter of first sleeve, and wherein the inner diameter of the second sleeve has a non-sealing interface with the cable when the cable is received in the termination.

8. The cable termination of claim 7 wherein, when the cable is received in the termination, the first sleeve has a first stretch pressure and the at least one conductor sealing sleeve has a second stretch pressure that is different from the first stretch pressure.

9. The cable termination of claim 8 wherein the first stretch pressure is less than the second stretch pressure and the release path extends rearwardly along an interface between the cable and first sleeve, when the cable is received in the termination.

10. The cable termination of claim 1 further comprising a mobile substance within the enclosure for equalizing the pressure throughout the enclosure and upon the cable conductive elements therein.

11. The cable termination of claim 10 wherein the second end of the housing is configured to cooperate with a second housing to sealably engage the first portion of the elastomeric body.

12. The cable termination of claim 11 wherein the retainer is cooperatively engaged with a heavy walled portion of the elastomeric body.

13. The cable termination of claim 12 wherein the retainer is captured within a portion of the heavy walled portion.

14. The cable termination of claim 13 wherein the mobile substance comprises a dielectric material.

15. The cable termination of claim 14 wherein the elastomeric body comprises at least one rib formed on an exterior portion thereof for creating a ventilation release path allowing equalization of pressure within the first housing to outside the first housing.

16. The cable termination of claim 15 wherein the retainer comprises a body having an opening configured to receive the cable.

17. The cable termination of claim 16 wherein the retainer further comprises a plurality of inclined tines extending radially inwardly from the body wherein the inclined tines have distal ends defining the opening.

18. The cable termination of claim 11 further comprising a mechanical standoff disposed within the enclosure and having a portion extending into contact with the second housing for retaining the elastomeric body on the cable.

19. The cable termination of claim 18 wherein the mechanical standoff comprises:
 a disc-shaped member having a hole therethrough disposed over the second sleeve of the elastomeric body; and
 a plurality of rods disposed in the enclosure and having a first end attached to the disc-shaped member and having a second end extending into contact with the second housing.

20. The cable termination of claim 19 wherein the side of the disc-shaped member opposite of the attachment of the rods is in close axial proximity to the heavy walled portion of the elastomeric body.

21. The cable termination of claim 20 wherein the conductive elements comprise optical fibers and further comprising a fiber management system attached to the mechanical standoff for retaining the optical fibers within the cable termination.

22. The cable termination of claim 21 wherein the fiber management system comprises a retainer clip attached at one end to one of the rods and having an opening at the other end for retaining the optical fibers therein.

23. The cable termination of claim 22 wherein the conductive elements further comprise a protective tube for protecting the optical fibers.

24. The cable termination of claim 23 wherein the cable termination further comprises an optical fiber penetrator connected to the protective tube.

25. The cable termination of claim 24 wherein the cable termination further comprises a gripping means adapted to be disposed on the first end of the first housing and around the cable for releasably holding the cable in the first end of the first housing.

26. The cable termination of claim 25 wherein a vent extends through the first housing for providing ventilation from inside the first housing to outside the first housing.

* * * * *